United States Patent [19]

Mitchell

[11] Patent Number: 5,102,216

[45] Date of Patent: Apr. 7, 1992

[54] EYEGLASSES RETAINER AND CASE

[76] Inventor: Troy E. Mitchell, 3435 Ocean Park Blvd. #102, Santa Monica, Calif. 90405

[21] Appl. No.: 488,304

[22] Filed: Mar. 5, 1990

[51] Int. Cl.⁵ .............................................. G02C 5/14
[52] U.S. Cl. ................................ 351/156; 351/123; 206/5
[58] Field of Search ............... 351/123, 155, 156, 157, 351/158; 206/5; 2/10, 12, 13, 15, 452

[56] References Cited

U.S. PATENT DOCUMENTS

| | | | |
|---|---|---|---|
| 3,728,012 | 4/1973 | Downey | 351/157 |
| 4,133,604 | 1/1979 | Fuller | 351/123 |
| 4,520,510 | 6/1985 | Daigle | 2/12 |
| 4,541,696 | 9/1985 | Winger et al. | 351/123 |
| 4,692,002 | 9/1987 | Meistrell | 351/156 |
| 4,696,556 | 9/1929 | Perry, III | 351/157 |
| 4,818,094 | 4/1989 | Lyons | 351/157 |
| 4,953,695 | 9/1990 | Tallman | 351/155 |

*Primary Examiner*—Paul M. Dzierzynski

[57] ABSTRACT

A stretch fabric is double rolled and then sewn to tubular straps at each end to form an eyeglasses retainer, case combination. The tubular straps are attached to the stems of eyeglasses and are held in place on the stems by elastic bands within the ends of the straps. The assembly is then worn around the head or neck as a retainer preventing the eyeglasses from sliding forward or falling off in sports and such. When the eyeglasses are not worn they can be folded and placed within the cavity formed by unrolling the double roll of the case.

4 Claims, 2 Drawing Sheets

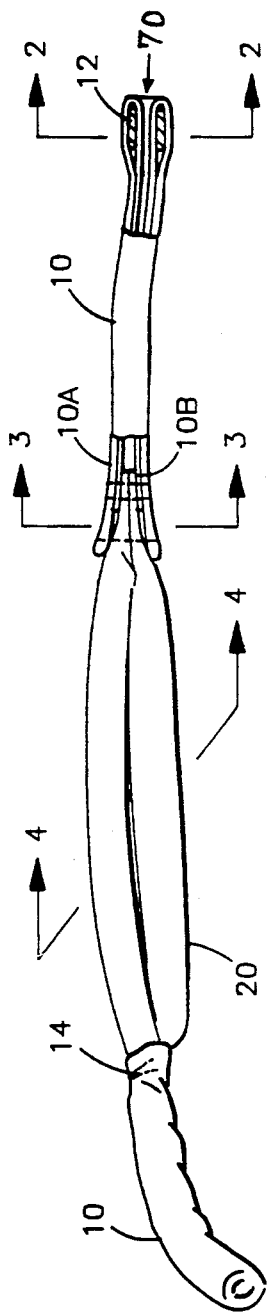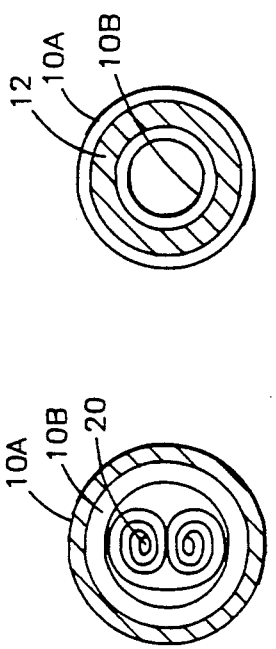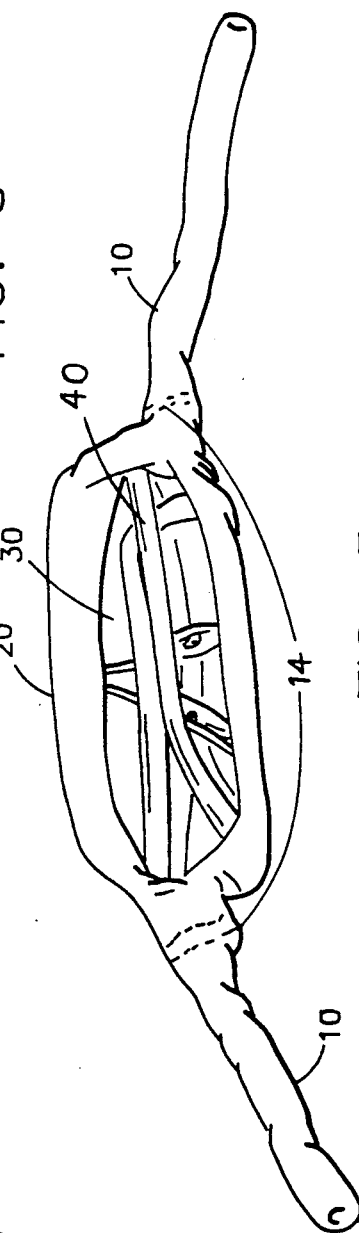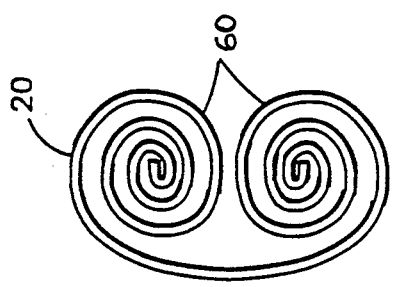

EYEGLASSES RETAINER AND CASE

BACKGROUND OF THE INVENTION

The invention relates to retainers for eyeglasses which fit around the head during the wearing of eyeglasses and which attach to the eyeglasses, and more particularly to such a retainer which can also be used as an eyeglasses case for protecting the eyeglasses when they are not being worn.

DESCRIPTION OF THE PRIOR ART

The prior art teaches several retainers for eyeglasses. U.S. Pat. No. 3,728,012 to Downey discloses a string-like retainer which passes through openings in the eyeglasses stems and is longitudinally adjustable. U.S. Pat. No. 4,133,604 to Fuller shows a headband that serves as a retainer attaching at tubular elements formed as an integral part of the retainer. U.S. Pat. No. 4,541,696 to Winger et al. is a retainer made of knit material and functioning similarly to Fuller. U.S. Pat. No. 4,692,002 to Meistrell comprises a long stretchable band having holes for insertion of the eyeglasses stems for attachment. U.S. Pat. No. 4,696,556 to Perry III is a headband retainer similar to Winger but having an improved end design. U.S. Pat. No. 4,818,094 to Lyons is similar to several prior art designs but includes the improvement of an adjustment ring for elimination of slack in the attachment. None of the prior art disclosures show the combination of features and capabilities of the instant invention. It is the applicants opinion that the combination of features of the instant invention make it quite unique and extremely useful.

SUMMARY OF THE INVENTION AND OBJECTS

The invention is a combination eyeglasses retainer and eyeglasses protective cover comprising a protective case having a connection means attached at each end. The connection means provides for temporarily joining the case to the stems of a pair of eyeglasses. The protective case and the connection means form a linear band for retaining eyeglasses on a wearers head. When not being worn the eyeglasses can be removed from the head and placed within the protective case. In the preferred embodiment, the protective case is a linear double roll of stretch fabric stitched closed at each end where the connection means is attached. At the center of the double roll, the rolled fabric can be temporarily unrolled exposing a cavity into which the eyeglasses can be placed for protective storage. The connection means is a coaxial arrangement of flexible tubes with a short elastic tube captured at the free end. The stem of the eyeglasses fits tightly into the free end and is held by the elastic tube. A snug fit of the invention when used as a retainer around the head is obtained by removing slack through adjustment of the free ends on the eyeglasses stems. The invention can, of course, be used for vision correction eyeglasses, sunglasses, safety glasses and goggles or any other eyewear.

It is the primary object of the instant invention to provide a combination device having the advantages of the eyeglasses retainer strap and the eyeglasses protective case in a single unit.

A specific object of the invention is to provide a combination eyeglasses retainer and protective cover which easily attaches to a pair of eyeglasses providing adjustment for a snug fit.

Another specific object of the invention is to provide a combination eyeglasses retainer and protective cover which is light weight and has no more bulk than a simple eyeglasses retainer strap.

These, together with the various ancillary objects and features of the invention which will become apparent as the following description proceeds, are attained by this protective cover, the preferred embodiment thereof being shown in the accompanying drawing, by way of example only.

DESCRIPTION OF THE DRAWINGS

FIG. 1 is a perspective drawing of the invention showing details of construction.

FIG. 2 is a cross section view of connection means 10.

FIG. 3 is a cross section view of connection means 10 at its attachment with protection means 20.

FIG. 4 is a cross section view of protection means 20.

FIG. 5 is a view of the invention in use as an eyeglasses case.

DRAWING REFERENCE NUMERALS

Figure 6:
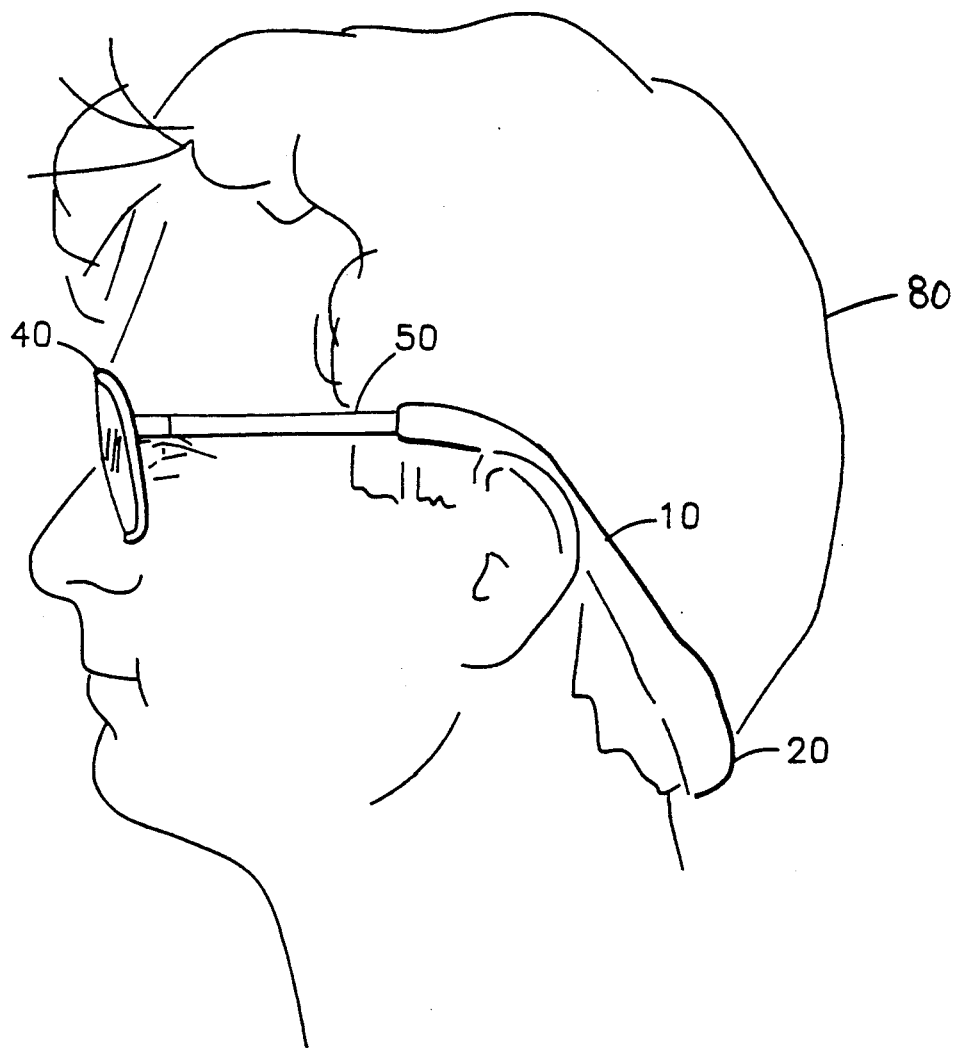
FIG. 6 is a view of the invention in use as a retainer on a wearer's head.

10—connection means
10A—outer sheath
10B—inner sheath
12—elastic tube
14—stitching
20—protection means
25—attachment means
30—cavity
40—eyeglasses
50—stem
60—double roll of sheet goods
70—free end
80—head

DESCRIPTION OF THE PREFERRED EMBODIMENT

As shown in FIG. 1 connection means 10 is attached by stitching 14 at both ends of protection means 20. Connection means 10 comprises outer sheath 10A and inner sheath 10B in coaxial arrangement, with elastic tube 12 captured at free end 70. FIG. 2 shows the cross section of the coaxial arrangement whereby elastic tube 12 is captured between inner and outer sheaths 10A and 10B. One end of protection means 20 is inserted into inner sheath 10B of each connection means 10 as shown in FIG. 3. Protection means 20 comprises double roll 60 as shown in FIG. 4.

OPERATION OF THE INVENTION

With reference to FIG. 5 protection means 20 is opened by unrolling double roll 60 to expose cavity 30. Eyeglasses 40 are placed in cavity 30 for protection. For use as a retainer, eyeglasses stems 50 are inserted into free ends 70 of connection means 10 and the invention is placed around head 80 as shown in FIG. 6.

What is claimed is:

1. In a unitary device, an integrally combined conventional, stemmed eyeglasses container and protective case comprising a protection means formed from a rolled sheet of flexible material, and a pair of stem-connection means attached to said protection means on opposite sides thereof, each of said connection means having attachment means for temporarily joining said connection means to one stem of a pair of said conventional eyeglasses, said protection means and said connection means jointly providing means for retention of said eyeglasses on a wearer's head while also providing alternate storage means comprising a cavity in said flexible material, when partially unrolled, for the storage of said conventional eyeglasses within said cavity when not being worn.

2. A combination eyeglasses retainer and protective case comprising a protection means formed as a double roll of sheet goods having ends secured by stitching, and a pair of connection means attached to said protection means on opposite sides thereof, each said connection means having attachment means comprising a elastic tube for securing the free end of said connection means to one stem of a pair of eyeglasses, whereby said protection means in a first tightly wrapped configuration and said connection means are used jointly to retain said eyeglasses on a wearers head and alternately said protection means in a second, unrolled configuration provides a cavity for the storage of said eyeglasses when not being worn.

3. The combination of claim 2 wherein said connection means has tubular shape and is attached to said protection means by stitching.

4. The combination of claim 2 wherein said connection means is a coaxial tube having an elastic tube captured within the free end of said coaxial tube, said elastic tube fitting tightly on said eyeglasses stem for holding said connection means at a selected position on said stem.

* * * * *